United States Patent
Arimilli et al.

(10) Patent No.: US 6,460,117 B1
(45) Date of Patent: Oct. 1, 2002

(54) SET-ASSOCIATIVE CACHE MEMORY HAVING A MECHANISM FOR MIGRATING A MOST RECENTLY USED SET

(75) Inventors: Ravi Kumar Arimilli; Lakshminarayana Baba Arimilli, both of Austin; John Steven Dodson, Pflugerville; James Stephen Fields, Jr.; Guy Lynn Guthrie, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,409

(22) Filed: Jun. 24, 1999

(51) Int. Cl.[7] ............................................. G06F 12/00
(52) U.S. Cl. ......................... 711/128; 711/122; 365/49
(58) Field of Search .................................. 711/128, 151, 711/122, 121; 365/49, 50

(56) References Cited

U.S. PATENT DOCUMENTS

| | | | | |
|---|---|---|---|---|
| 4,823,259 A | * | 4/1989 | Aichelmann, Jr. et al. | 711/122 |
| 5,276,848 A | * | 1/1994 | Gallagher et al. | 711/121 |
| 5,883,904 A | * | 3/1999 | Arimilli et al. | 714/710 |
| 5,900,012 A | * | 5/1999 | Tran | 711/120 |
| 5,920,888 A | * | 7/1999 | Shirotori et al. | 711/128 |

* cited by examiner

Primary Examiner—Matthew Kim
Assistant Examiner—Matthew D. Anderson
(74) Attorney, Agent, or Firm—Casimer K. Salys; Bracewell & Patterson, L.L.P.

(57) ABSTRACT

A set-associative cache memory having a mechanism for migrating a most recently used set is disclosed. The cache memory has multiple congruence classes of cache lines. Each congruence class includes a number of sets organized in a set-associative manner. The cache memory further includes a migration means for directing the information from a cache "hit" to a predetermined set of the cache memory.

16 Claims, 4 Drawing Sheets

SET-ASSOCIATIVE CACHE MEMORY HAVING A MECHANISM FOR MIGRATING A MOST RECENTLY USED SET

RELATED PATENT APPLICATION

The present patent application is related to copending application U.S. Ser. No. 09/339,410, filed on even date.

BACKGROUND OF THE INVENTION

1. Technical Field

The present invention relates to cache memories in general, and in particular to set-associative cache memories. Still more particularly, the present invention relates to a set-associative cache memory having a mechanism for migrating a most recently used set.

2. Description of the Prior Art

In order to increase the speed of access to data stored within a main memory, modern data processing systems generally maintain the most recently used data in a high-speed memory known as a cache memory. This cache memory has multiple cache lines, with several bytes per cache line for storing information in contiguous addresses within the main memory. In addition, each cache line has an associated tag that typically identifies a partial address of a corresponding page of the main memory. Because the information within each cache line may come from different pages of the main memory, the tag provides a convenient way identify to which page of the main memory the information within a cache line belongs.

In a typical cache memory implementation, information is stored in one or several memory arrays. In addition, the corresponding tags for each cache line are stored in a structure known as a directory or tag array. Usually, an additional structure, called a translation lookaside buffer (TLB), is utilized to facilitate the translation of an effective address to a real address during a cache memory access.

In order to access a byte in a cache memory with an effective address, the mid-order bits, for example, of the effective address are utilized to select a cache line from the memory array along with a corresponding tag from the directory. The low-order bits, for example, of the effective address are then utilized to choose the indicated byte from the selected cache line. At the same time, the high-order bits, for example, of the effective address are translated via the translation lookaside buffer to determine a real page number. If the real page number obtained by this translation matches the real address tag stored within the directory, then the data read from the selected cache line is the data actually sought by a processing unit. This is commonly referred to as a cache "hit," meaning the requested data was found in the cache memory. If the real address tag and translated real page number do not agree, a cache "miss" occurs, meaning that the requested data was not stored in the cache memory. Accordingly, the requested data have to be subsequently retrieved from the main memory or elsewhere within the memory hierarchy.

With a direct-mapped cache, only one of the group of corresponding lines from all pages in a real memory page can be stored in the cache memory at a time; but in order to achieve a better "hit" ratio, sometimes a set-associative cache is utilized instead. For example, with an N-way set associative cache, corresponding lines from N different pages may be stored. Since all entries can be distinguished by their associated tags, it is always possible to resolve which of the N lines having the same line number contains the requested information. The resolution requires comparison of the translated real page number to the N tags associated with a given line number. Each comparison generates an input to an N-to-1 multiplexor to select an appropriate cache line from among the N possibilities. In order to achieve high parallelism and uniformity within the cache design, according to the prior art cache architecture, each set within the N-way set-associative cache is identical in size. Furthermore, the layout and wiring of the N-way set-associative cache are fashioned in such a manner that the access time to each set within the cache is identical.

SUMMARY OF THE INVENTION

A cache memory has multiple congruence classes of cache lines. Each congruence class includes a number of sets organized in a set-associative manner. In accordance with a preferred embodiment of the present invention, the cache memory further includes a migration means for directing information from a cache "hit" to a predetermined set of the cache memory.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of processors having a cache memory. The cache memory may be, for example, a primary cache, a secondary cache, or a tertiary cache.

Figure 1:
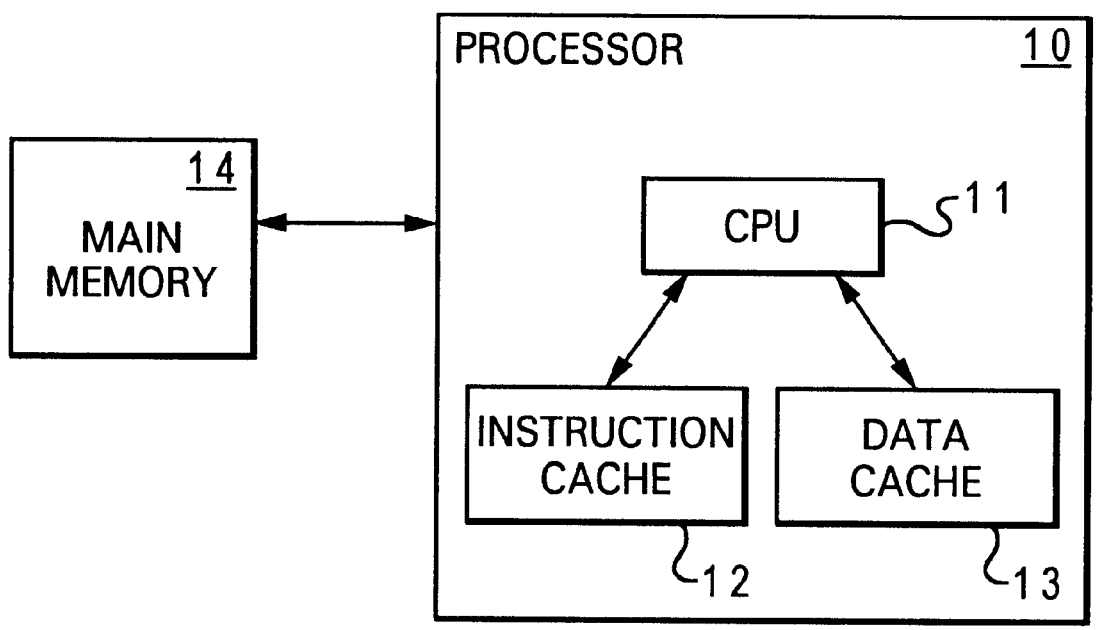
FIG. 1 is a block diagram of a general structure of a processor in accordance with a preferred embodiment of the invention.

Referring now to the drawings and in particular to FIG. 1, there is depicted a block diagram of a general structure of a processor in accordance with a preferred embodiment of the invention. As shown, processor 10 includes a central processing unit (CPU) 11, an instruction cache 12, and a data cache 13. CPU 11 is preferably connected to instruction cache 12 and data cache 13 via respective high bandwidth buses. Processor 10 is also coupled to a main memory 14. Both instruction cache 12 and data cache 13 are high speed set-associative caches which enable processor 10 to achieve a relatively fast access time to a subset of instructions or data previously transferred from main memory 14.

Figure 2:
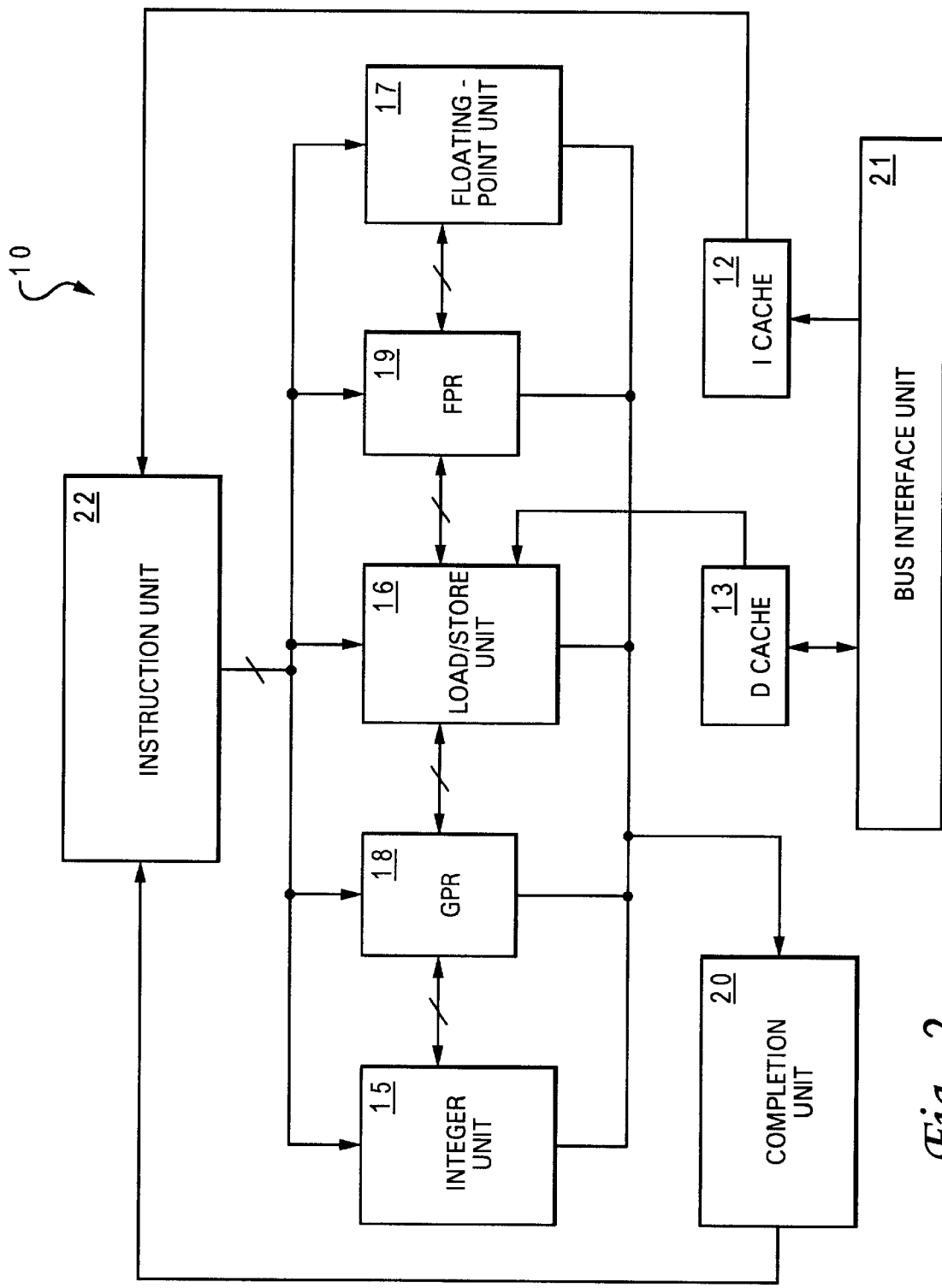
FIG. 2 is a detailed block diagram of the processor from FIG. 1, in accordance with a preferred embodiment of the present invention.

With reference now to FIG. 2, there is depicted a detailed block diagram of processor 10 in accordance with a preferred embodiment of the present invention. Within processor 10, a bus interface unit 21 is coupled to instruction cache 12 and data cache 13. Instruction cache 12 is further coupled to an instruction unit 22 which fetches instructions from instruction cache 12 during each execution cycle.

Processor 10 also includes at least three execution units, namely, an integer unit 15, a load/store unit 16, and a floating-point unit 17. These three execution units are collectively known as CPU 11 as depicted in FIG. 1. Each of execution units 15–17 can execute one or more classes of instructions, and all execution units 15–17 can operate concurrently during each processor cycle. After execution of an instruction has terminated, any of execution units 15–17 stores data results to a respective rename buffer, depending upon the instruction type. Then, any one of execution units 15–17 may signal a completion unit 20 that the execution of an instruction has finished. Finally, each instruction is completed in program order, and the result data are transferred from a respective rename buffer to a general purpose register 18 or a floating-point register 19, accordingly.

Figure 3:
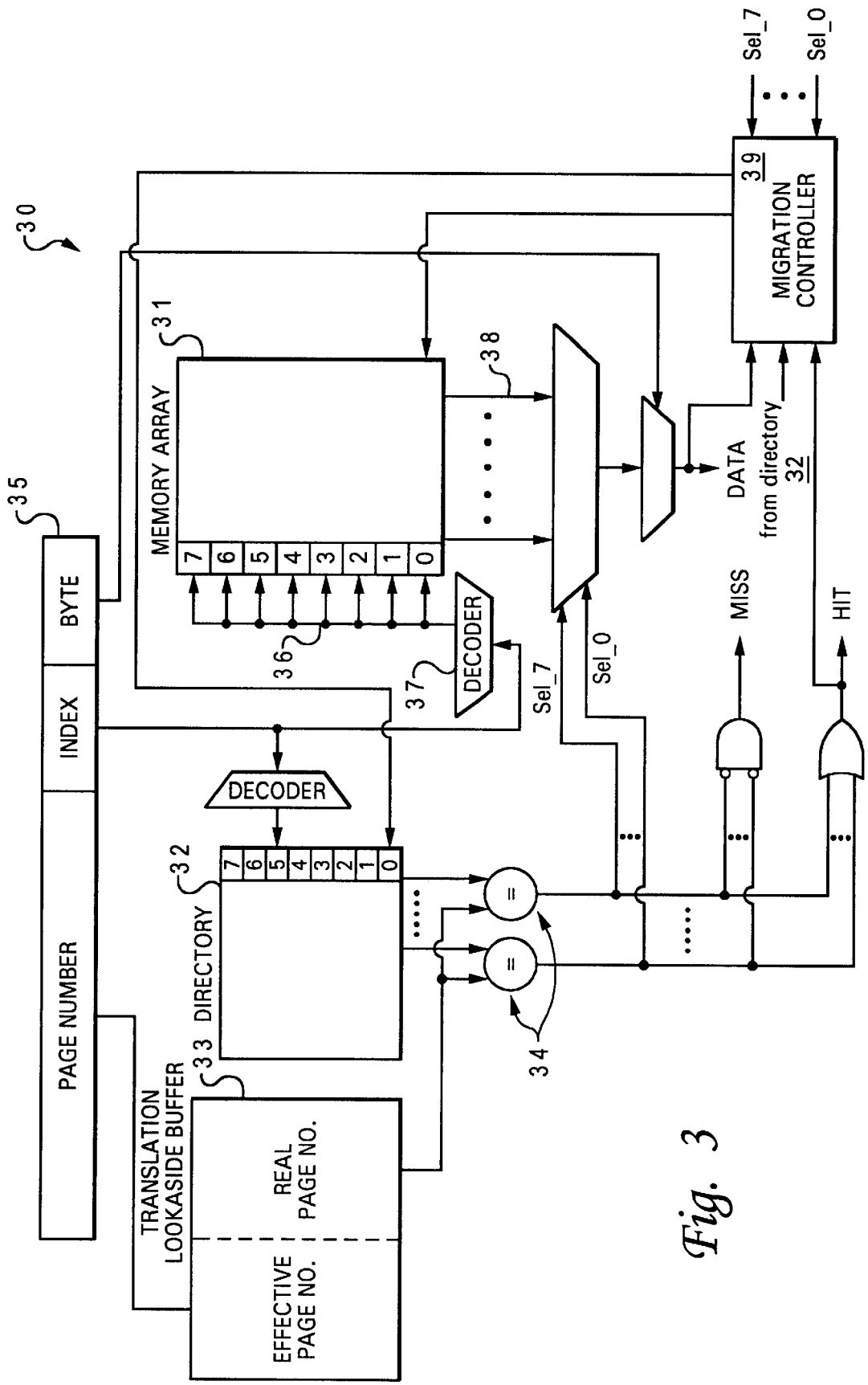
FIG. 3 is a block diagram of a set-associative cache memory having a mechanism for migrating a most recently used set, in accordance with a preferred embodiment of the present invention.

Referring now to FIG. 3, there is depicted a block diagram of a set-associative cache memory in accordance with a preferred embodiment of the present invention. As shown, a set-associative cache memory 30 includes memory array 31 along with a directory 32. Set-associative cache memory 30 may be an instruction cache, such as instruction cache 12 in FIG. 2, or a data cache, such as data cache 13 in FIG. 2. Each cache line in memory array 31 has a corresponding row in directory 32. The data or instructions portion of a cache line is maintained in memory array 31 while the tag portion of the same cache line is maintained in directory 32. Cache memory 30 also includes a TLB 33 for translating an effective address to a corresponding real address.

For the purpose of illustration, cache memory 30 is an eight-way set-associative cache memory. As a preferred embodiment of the present invention, fanout wiring 36 from a decoder 37 for accessing memory array 31 is incrementally distributed (i.e., distance from decoder 37 incrementally increase) across all eight sets within memory array 31 which may require a number of latch stages to maintain an adequate cycle time. Within memory array 31, the distance between each set and output wiring 38 also incrementally increases across the sets. For example, as shown in memory array 31 of FIG. 3, set 0 is proportionally closer to address decoder 37 (1 cycle) than set 1, set 1 is proportionally closer to address decoder 37 (2 cycles) than set 2, set 2 is proportionally closer to address decoder 37 (3 cycles) than set 3, etc. Similarly, set 0 is proportionally closer to output wiring 38 (1 cycle) than set 1, set 1 is proportionally closer to output wiring 38 (2 cycles) than set 2, set 2 is proportionally closer to output wiring 38 (3 cycles) and than set 3, etc. Hence, signal propagation latency from address decoder 37 to each set within memory array 31 is directly proportional to the distance (i.e., number of latch stages) between address decoder 37 and the set. Also, the signal propagation latency from each set within memory array 31 to the output of memory array 31 is directly proportional to the distance between the set and the output of memory array 31. As a result, the latency for a cache access is different for each of the eight sets within memory array 31, depending on the set in which the instruction or data is being stored. In other words, there is an access latency varies incrementally among sets, from the fastest set 0 to the slowest set 7.

The information stored in memory array 31 may be accessed by an effective address 35. Effective address 35 includes a byte field, an index field, and a page number field. The index field of effective address 35 is utilized to select a specific congruence class within memory array 31 and the byte field of effective address 35 is utilized to index a specific byte within the selected cache line. In addition, the page number field of effective address 35 is sent to TLB 33 to be translated to a corresponding real page number. This real page number is utilized for comparison with a tag of the selected cache line from directory 32 via comparators 34 in order to determine whether there is a cache "hit" or "miss." Incidentally, a match between a tag from one of eight ways in directory 32 and the real page number implies a cache "hit."

After a cache "hit," the cache information is sent to the CPU, and the cache information and its associated directory information are also transferred to the first set (i.e., set 0) of memory array 31 and directory 32, respectively, via a migration mechanism. As shown in FIG. 3, a migration controller 39 is part of the migration mechanism and controls the migration of the "hit" information within memory array 31 and directory 32.

Figure 4:
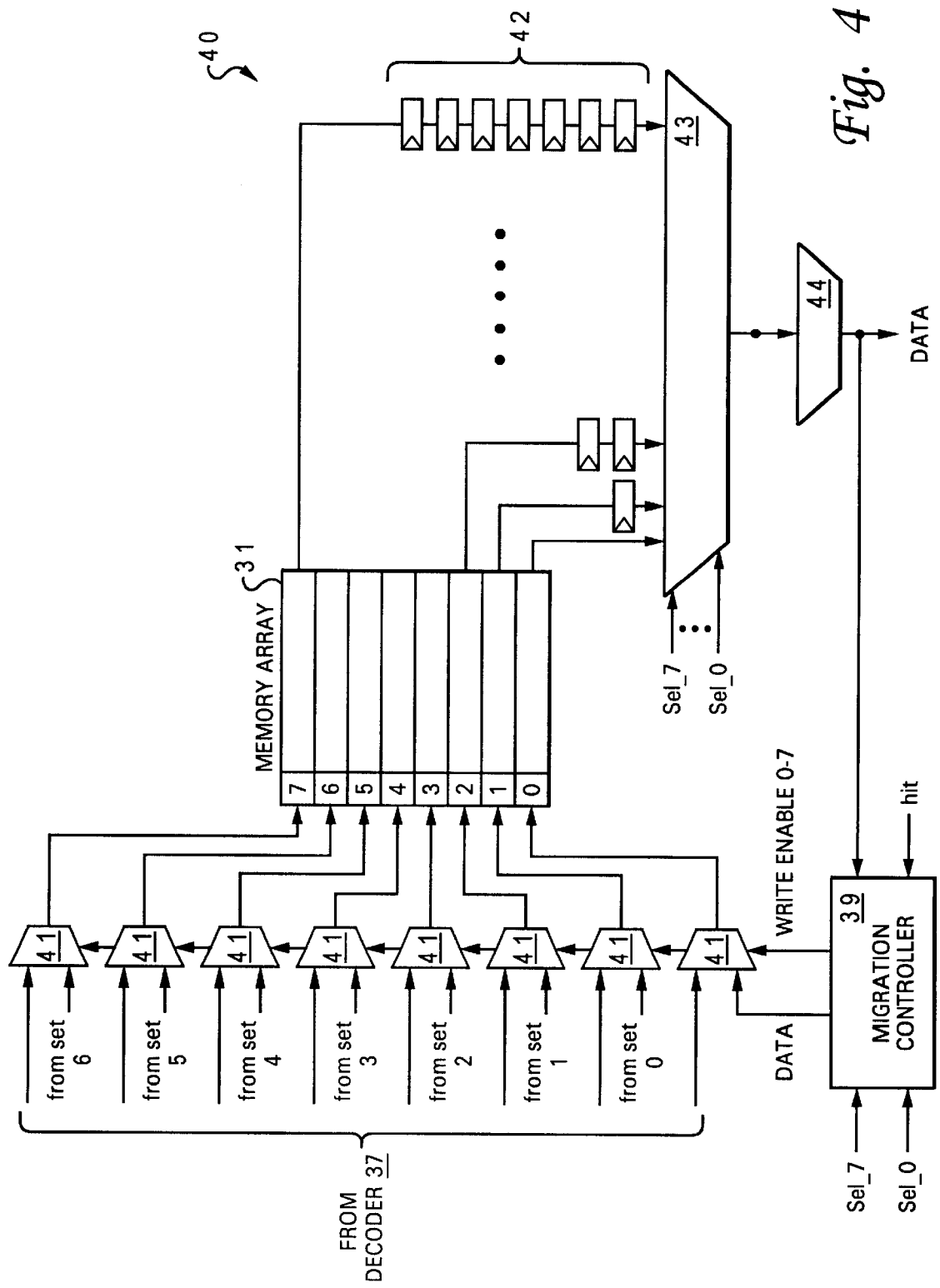
FIG. 4 is a detailed block diagram of the migration mechanism from FIG. 3, in accordance with a preferred embodiment of the present invention.

With reference now to FIG. 4, there is illustrated a detailed block diagram of the migration mechanism from FIG. 3, in accordance with a preferred embodiment of the present invention. For simplicity sake, only the migration mechanism for memory array 31 (of FIG. 3) is illustrated in FIG. 4, and it is understood by those skilled in the relevant art that the same principle can be applied to the migration mechanism for directory 32 (of FIG. 3). As shown, a migration mechanism 40 includes migration controller 39 and multiple multiplexors 41. Each of multiplexors 41 is associated with one of the sets within memory array 31. Latches 42 represent the latch stage delay among the sets for the data to propagate to multiplexor 43.

Migration controller 39 receives a "hit" signal (from FIG. 3), sel_0 through sel_7 signals (from FIG. 3), and data signal from multiplexor 44 as inputs. These inputs are then utilized by migration controller 39 to generate write enable signals for set 0 through set 7 and data signal (same as the input data signal). The write enable signals from migration controller 39 control a write enable input of a respective multiplexor for each of the sets in a manner as described below. Migration controller 39 can be implemented as a state machine as it is understood by those skilled in the relevant art.

After a cache "hit" signal is received, migration controller 39 simultaneously directs the cache "hit" information to set 0 of memory array 31 while the information in each set of the respective arrays is shifted towards the set in which the "hit" information originally resided. For example, if the "hit" information originally resides in set 3, after the "hit" information has been sent to multiplexors 43 and 44, the information stored in set 3 will be replaced with the information stored in set 2. Subsequently, the information stored in set 2 will be replaced with the information stored in set 1, and the information stored in set 1 will be replaced with the information stored in set 0. Information stored in sets 4–7 remain unchanged, in this example, via a non-assertion of a write enable signal to their respective associated multiplexors 41. Finally, the information stored in set 0 will be replaced by the "hit" information (originally stored from set 3). As a result, the most recently used (MRU) cache line is automatically placed in set 0 of memory array 31 (which is the set having the shortest access time).

As has been described, the present invention provides a set associative cache memory having a set associative cache memory having a mechanism for migrating a most recently used set in order to reduce the average access time of the cache. Although eight ways are shown in the present disclosure, it is understood by those skilled in the art that the number of ways can be any number higher than one. In addition, the incremental latency of the memory array in the present disclosure is assumed to be one cycle between adjacent sets, though it is understood by those skilled in the art that this incremental latency can be any number of cycles. For example, set 0–3 may not require any latch stage delays while sets 4–7 may only require one latch stage delay. With the present invention, speed improvements in cache access latency can be expected because the MRU, which is the set most likely to be accessed again in a short time, is migrated to the set that is closest to the output of the memory array, which has the shortest access time among sets.

For some software applications, the MRU set may not be the most likely set to be accessed again immediately. Thus, it is understood by those skilled in the art that the present invention can be modified to migrate the "hit" information to any one of the sets within the cache memory array, as desired by the specific application, in order to provide an optimal speed performance.

While the invention has been particularly shown and described with reference to a preferred embodiment, it will be understood by those skilled in the art that various changes in form and detail may be made therein without departing from the spirit and scope of the invention.

What is claimed is:

1. A cache memory, comprising:
    a plurality of congruence classes of cache lines, wherein each of said congruence classes includes a plurality of sets organized in a set-associative manner, wherein each of said plurality of sets within said cache memory has an access time dependent on a relative location of each of said plurality of sets to an output of said cache memory; and
    a migration means for directing information from a cache match to a predetermined one of said plurality of sets of said cache memory.

2. The cache memory according to claim 1, wherein said predetermined set is closest to said output of said cache memory.

3. The cache memory according to claim 2, wherein said migration means places information from a set with said cache match to said predetermined set closest to said output of said cache memory.

4. The cache memory according to claim 3, wherein said migration means places information from said set with said cache match to said predetermined set closest to said output of said cache memory after said migration means migrates information from said predetermined set closest to said output of said cache memory to an immediate adjacent set.

5. The cache memory according to claim 1, wherein said cache memory further includes fanout wiring incrementally distributed between an address decoder and each of said plurality of sets.

6. The cache memory according to claim 1, wherein said cache memory further includes output wiring incrementally distributed between each of said plurality of sets and an output.

7. The cache memory according to claim 1, wherein said cache memory is a primary cache.

8. The cache memory according to claim 1, wherein said cache memory is a secondary cache.

9. A processor, comprising:
    a central processing unit; and
    a cache memory coupled to said central processing unit, wherein said cache memory includes:
        a plurality of congruence classes of cache lines, wherein each of said congruence classes includes a plurality of sets organized in a set-associative manner, wherein each of said plurality of sets within said cache memory has an access time dependent on a relative location of each of said plurality of sets to an output of said cache memory; and
        a migration means for directing information from a cache match to a predetermined one of said plurality of sets of said cache memory.

10. The processor according to claim 9, wherein said predetermined set is closest to said output of said cache memory.

11. The processor according to claim 10, wherein said migration means places information from a set with said cache match to said predetermined set closest to said output of said cache memory.

12. The processor according to claim 11, wherein said migration means places information from said set with said cache match to said predetermined set closest to said output of said cache memory after said migration means migrates information from said predetermined set closest to said output of said cache memory to an immediate adjacent set.

13. The processor according to claim 9, wherein said cache memory further includes fanout wiring incrementally distributed between an address decoder and each of said plurality of sets.

14. The processor according to claim 9, wherein said cache memory further includes output wiring incrementally distributed between each of said plurality of sets and an output.

15. The processor according to claim 9, wherein said cache memory is a primary cache.

16. The processor according to claim 9, wherein said cache memory is a secondary cache.

* * * * *